United States Patent [19]

Huang

[11] Patent Number: 4,499,555
[45] Date of Patent: Feb. 12, 1985

[54] SORTING TECHNIQUE

[75] Inventor: Alan Huang, Ocean Township, Monmouth County, N.J.

[73] Assignee: AT&T Bell Laboratories, Murray Hill, N.J.

[21] Appl. No.: 375,669

[22] Filed: May 6, 1982

[51] Int. Cl.³ .............................................. G06F 15/21
[52] U.S. Cl. ................................................... 364/900
[58] Field of Search ........................ 364/900 MS File

[56] References Cited

PUBLICATIONS

Jansen, P. G. et al., "The Dimond: A Component for the Modular Construction of Switching Networks", IEEE Trans. on Computers, vol. C-29, No. 10, Oct. 1980, pp. 884-889.
"Bubble Sorting", Popular Computing, vol. 8, No. 11, Nov. 1980, pp. 2-10.
Merritt, S. M., "A Top Down Approach to Sorting", SIGCSE Bulletin, vol. 13, No. 1, Feb. 1981, pp. 192-195.
Lee et al., "An On-Chip Compare/Steer Bubble Sorter", IEEE Trans. on Computers, vol. C-30, No. 6, Jun. 1981, pp. 396-405.

Primary Examiner—Raulfe B. Zache
Attorney, Agent, or Firm—Barry H. Freedman

[57] ABSTRACT

A serial chain of N sorting modules is arranged to sort batches of up to N items in a desired sequence in accordance with the value of the items. Each sorting module is arranged to compare two input items, to select one item for transfer to the next module, depending upon the relative value of the items, and to simultaneously accept the next item from the previous module. The value of the items can be numeric, alphabetic, et cetera. In accordance with the invention, each module is also arranged to detect the occurrence of an item having a unique value which indicates the beginning of a batch of items. Upon detection, each module passes the items in the same order as they were received, independent of their value.

A chain of modules may be used to sort records each having data and an associated key by applying the keys to sorting circuits and the data to slave circuits.

Record sorting can be used to interchange the time slots of a time-division multiplexed signal, or to rearrange empty slots such that they can be utilized.

16 Claims, 12 Drawing Figures

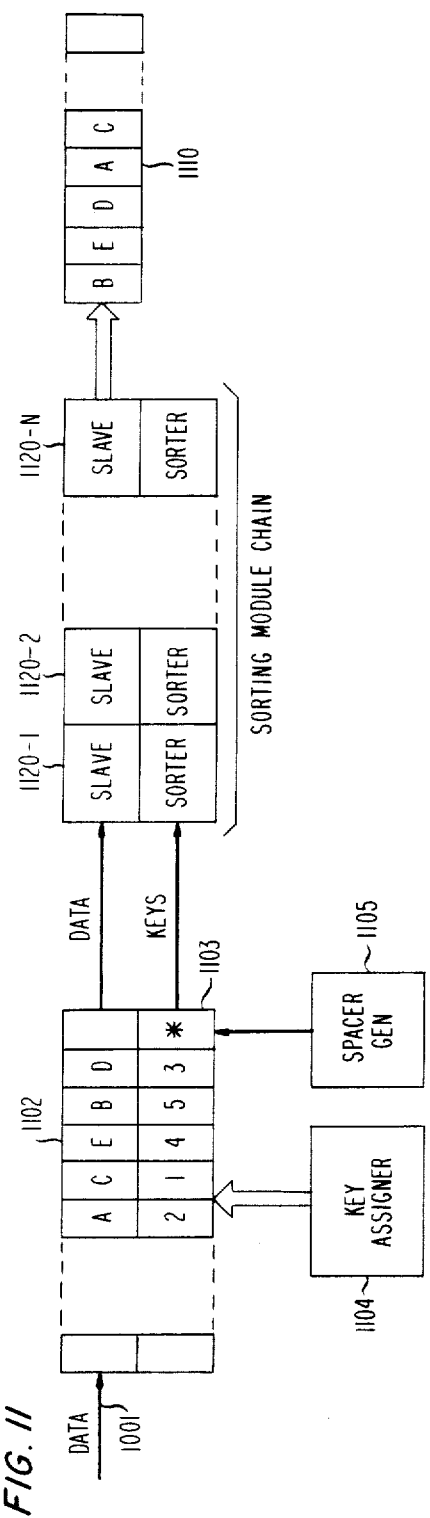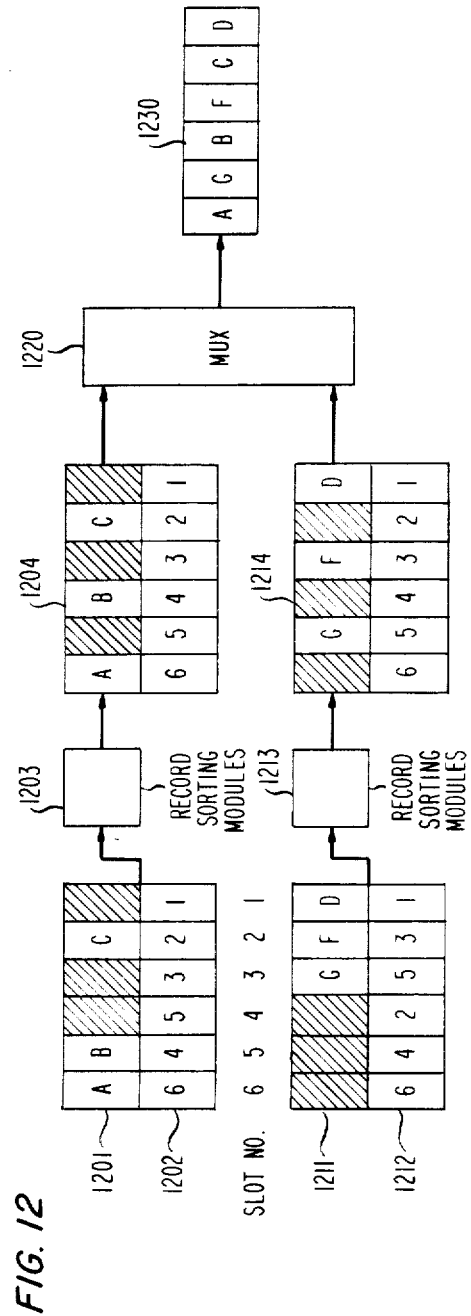
FIG. 11
FIG. 12

SORTING TECHNIQUE

BACKGROUND OF THE INVENTION

1. Field of the Invention

The present invention relates generally to apparatus and a technique for sorting and, in particular, to a bubble sorting technique implemented in a serial chain of sorting modules.

2. Description of the Prior Art

Since "virtually every important aspect of programming arises somewhere in the context of sorting or searching" (D. E. Knuth, The Art of Computer Programming, Vol. III, Addison-Wesley, 1973), the subject has been widely studied both by computer scientists as well as electronics hardware designers, and numerous techniques including selection sort, heap sort, insertion sort and merge sort have been described in the literature. Yet another technique, called "bubble sorting", is also very popular, and even this one technique has been known by several names, including interchange sorting, exchange sorting and sinking sort. Despite this diversity in nomenclature, it is generally agreed that the essence of a bubble sort is the interchange of two adjacent items in the batch being sorted. During each interchange, the values of the items are compared, and the items are rearranged if necessary, so as to put them in a predetermined relationship, eg, smallest first or largest first. The interchanges are typically performed sequentially, generally by repeatedly scanning or traversing all items in the batch until no further interchanges have been made, at which time the entire batch has been sorted as desired. Many of the bubble sort techniques are software implemented (see, eg, Popular Computing, Vol. 8, No. 11, November 1980, "Bubble Sorting", pp. 2-10) and thus must essentially be limited to a series of sequential operations, since most general purpose computers include only one processor. To overcome resultant processing speed limitations, various hardware implementations have been devised for bubble sorting, using conventional integrated circuit technology and magnetic bubble domain devices. An example of the latter is described in an article by D. T. Lee et al entitled "An On-Chip Compare/Steer Bubble Sorter", *IEEE Trans. on Computers*, Vol. C-30, No. 6, June 1981, pp. 396-405 (see particularly FIG. 6), while an IC implementation is described in an article by P. G. Jansen et al entitled "The DIMOND: A Component for the Modulator Construction of Switching Networks", *IEEE Trans. on Computers*, Vol. C-29, No. 10, October 1980, pp. 884-889 (see particularly FIG. 8).

The effectiveness of any of the prior art bubble sorting arrangements must be measured against a large number of factors, such as the available throughput and latency as well as the required memory size. Ideally, the apparatus should be flexible in terms of the number of items that can be sorted in each batch and the design be amenable to modular fabrication using VLSI technology. Many of the known sorting arrangements which have been successful in improving performance in terms of some of the above criteria have nevertheless been costly or difficult to implement.

In view of the foregoing, it is the broad object of the present invention to provide a sorting technique which is efficient in terms of latency, throughput and memory requirements, and which can be implemented in a modular arrangement suitable for VLSI fabrication. In particular, it is important that flexibility be maintained, so that the number of items in each batch to be sorted can be reasonably varied.

SUMMARY OF THE INVENTION

The foregoing and additional objects are achieved in accordance with the principles of the present invention by sorting apparatus which includes a serial chain of identical sorting modules all of which can be clocked in unison. The items to be sorted occur in batches, with each item typically having a value which determines the order in which that item is to be arranged as compared to other items in the batch. At each clock pulse, an item is input to the first module, and each module containing two items is arranged to compare the values and to transfer either of the items to the next module, depending upon the type of sort desired. The items can be sorted numerically, alphabetically, or in accordance with any other predetermined relationship. The non-passed item is retained and used in the next comparison.

In accordance with the present invention, each module is arranged to recognize a special "spacer" item which precedes a batch of items to be sorted or which separates one batch of items from the next. When a spacer item is received by a sorting module, the items contained therein are output (at the next two clock pulses) in the same order in which they are received. This permits a chain of N sorting modules arranged as described above to efficiently sort batches of up to N items, as long as items in each batch are separated by a spacer item. As a result, throughput is increased, and the arrangement is more flexible than a conventional bubble sorter.

A similar system can be used to sort records which include data and an associated key. In this configuration, the keys are input to the sorting modules, while the corresponding data is rearranged by a series of slave modules.

The efficient sorting enabled by the present invention can also be used to perform permutations, by relabeling or manipulating the record keys in a desired manner. As an example, the sequence of a series of items can be reversed in time by assigning keys to the items in decreasing order. Sorting these records in increasing key order will then produce the items in reverse time sequence.

One particular application is the interchanging of time slots in a time-division multiplexed signal. For example, each time slot in a time-division multiplex signal can be viewed as the data portion of a record. By associating a key with the data in each time slot, the order of the slots can be conveniently interchanged, simply by processing the records using the sorting system of the present invention.

BRIEF DESCRIPTION OF THE DRAWING

The foregoing and additional features and advantages of the present invention will be more readily appreciated by consideration of the following detailed description when read in light of the accompanying drawing in which:

FIG. 11 illustrates the use of a serial chain of record sorting modules such as those of FIG. 7 or 8 for interchanging time slots of a time-division multiplex (TDM) signal; and FIG. 12 illustrates the use of a chain of record sorting modules of the type shown in FIG. 7 or 8 to rearrange empty time slots in a TDM signal.

DETAILED DESCRIPTION

Figure 1:
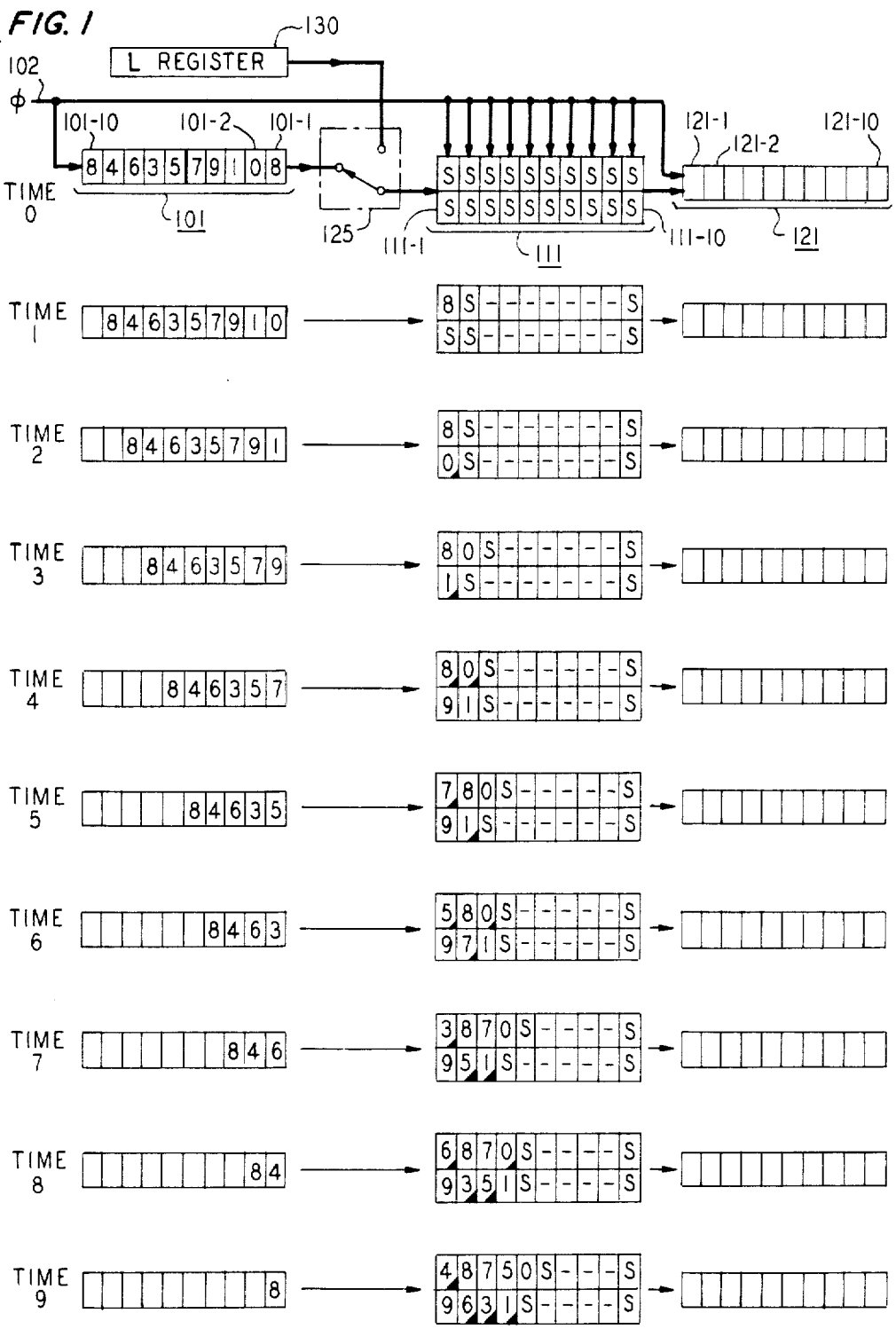
FIGS. 1-3 show how a series of items are sorted using a prior art bubble sorting technique.
Figure 2:
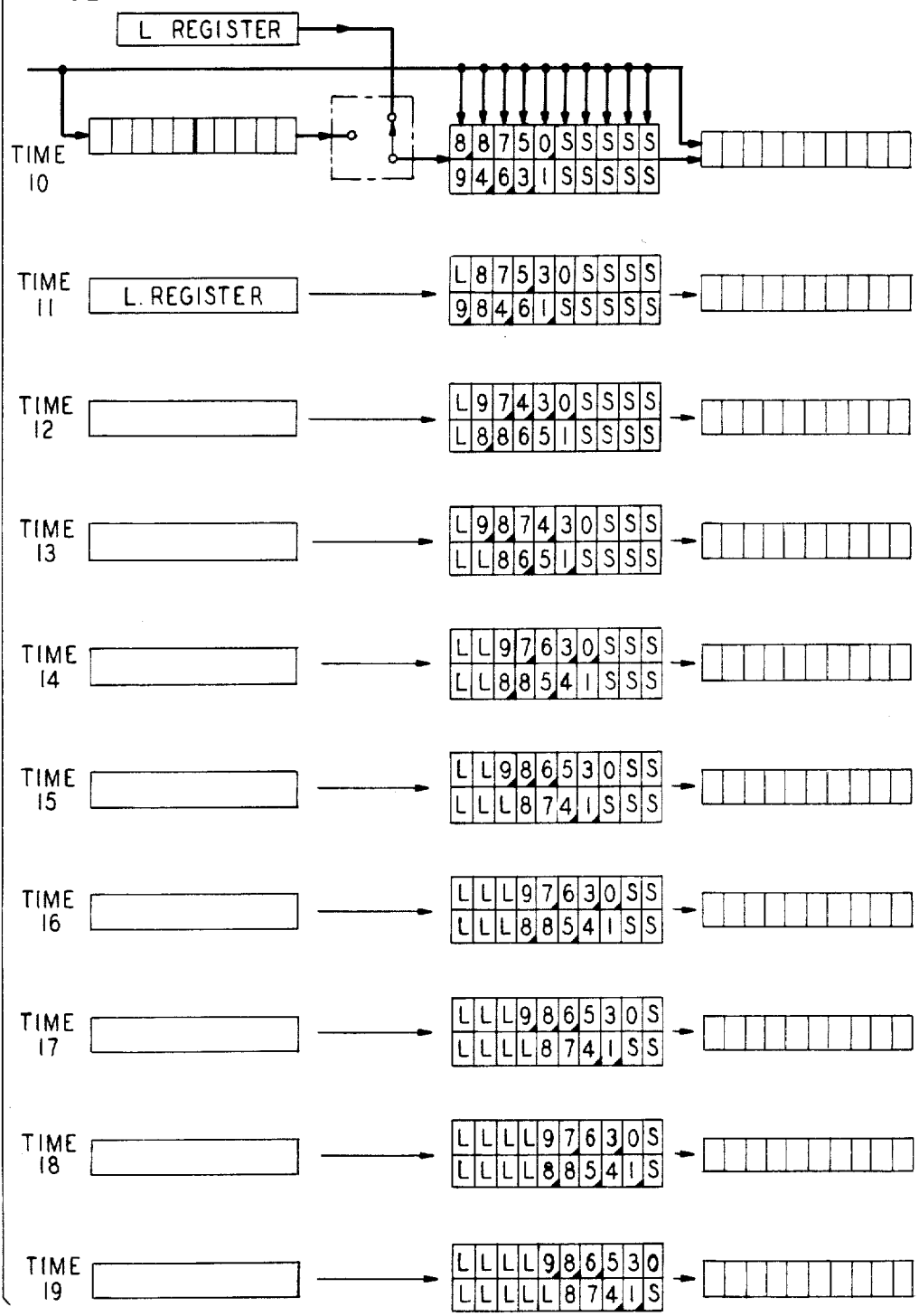
Figure 3:
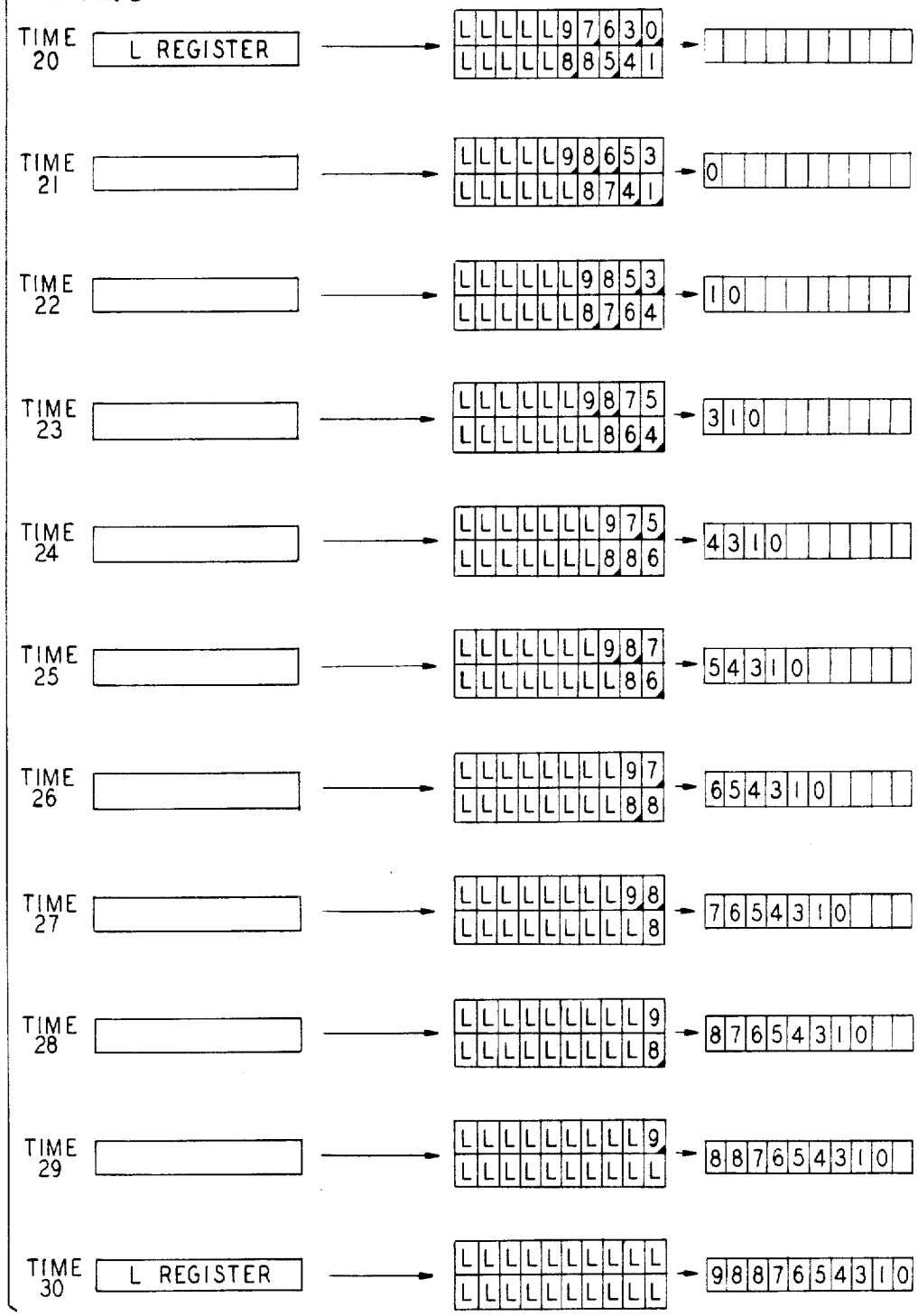

FIGS. 1-3 graphically illustrate the beginning, middle and final cycles, respectively, in a conventional bubble sort operation. In all three figures, the same reference designations are used for the same elements. As shown in FIG. 1, it is assumed that a sequence of ten items having numerical values 8, 0, 1, 9, 7, 5, 3, 6, 4 and 8 are to be sorted and that the items are preloaded at time t=0 in a ten position shift register 101 having individual storage locations 101-1 through 101-10. At each succeeding clock pulse $\phi$ on line 102, the contents of register 101 are moved one position to the right and the item presently contained in location 101-1 is applied to the input of a serial chain 111 of 10 sorting modules 111-1 through 111-10.

Each sorting module is arranged to store two applied items in storage elements shown graphically as upper and lower halves, and to compare the values of the stored items to select one item, depending on the type of sort desired. In the following example, an arrangement for providing a lowest to highest order will be described. Each module applies the selected item to its output which is coupled to the next sorting module or applied to a utilization device in the case of the last module. Simultaneously, each module accepts at its input a next item from the preceding module or from register 101 in the case of the first module. Typically, the modules operate synchronously, under control of clock pulses $\phi$ from a clock source (not shown). The output of the last module 111-10 is coupled to a utilization device such as register 121 which (like register 101) contains 10 storage locations 121-1 to 121-10 and which is clocked by pulses $\phi$ on line 102.

As shown in FIG. 1, all of the sorting modules 111-1 through 111-10 are initialized at time t=0 and each contains two items having "very small" values symbolized by the letter "s". By definition, the value "s" is smaller than any expected value in the batch of items to be sorted. Initialization may be accomplished in a variety of ways, and is necessary in prior art arrangements for purposes to be described below. At time t=0, after one clock pulse $\phi$ has occurred, the contents of register 101 have shifted one position to the right and the item with value "8" from storage location 101-1 is now stored in sorting module 111-1. Since all modules 111-1 through 111-10 initially contained items having the same value s before the occurrence of the first clock pulse, the contents of one storage location (graphically, the upper half) in each module were shifted, and the item having value "8" received from storage location 101-1 fills the vacated storage location in module 111-1 at the end of the first clock cycle. The item with value "s" output from the last sorting module 111-10 must be discarded, since this item serves no further useful function.

After the occurrence of the next clock pulse (t=2), the contents of register 101 have again shifted to the right, and the item with "0" value from storage location 101-1 has been input to sorting module 111-1. Since module 111-1 concurrently compares the values 8 and "s" for the items currently stored in its two storage locations and passes the item with value "s" to module 111-2, the item with value "0" is entered in the just vacated location (bottom half) of module 111-1. The remaining modules all operate in a similar fashion. Since at time t=2 all other modules contain items of value "s", these items in effect "ripple" through the vacated locations (top halves) of the remaining modules, and a second item with value "s" is discarded.

The foregoing process is repeated at each succeeding clock pulse $\phi$. After the third clock pulse, a comparison has occurred in module 111-1 between the key values (8 and 0) of the first two input items. The "0" is smaller, and that item is applied to the next module 111-2 in the chain. When yet another clock pulse occurs, the "0" is compared with the value of "s" in module 111-2; as stated previously, the value of "s" is smaller and that item is shifted. In order to make the location of the item to be shifted easier to detect in the graphical representation of FIGS. 1-3, one corner of the upper or lower module half which contains the item with the smaller value (before application of the next pulse $\phi$) has been shaded.

At the end of ten clock cycles, register 101 has been emptied, and its contents are now completely stored in sorting modules 111-1 through 111-5, each of which stores two items. It is now important for purposes described below, to begin to purge or cleanse the sorting module chain with items having "large" values designated by the symbol "L", which are larger than any possible value already in the sorting modules. Entry of the items with "large" values (20 are required in this example) may be accomplished simply by appending items with the desired large values at the end of each batch of items which it is desired to sort, or by repositioning a switch 125 so that items with large values stored in an auxiliary register 130 are applied to the sorting module chain after the items in each batch have been fully entered in the chain.

Continuing with the same example, but referring now to FIG. 2, after the 11$^{th}$ clock pulse (t=11), the first item with value "L" has entered sorting module 111-1. When 14 clock pulses have occurred, it is seen in FIG. 2 that the items are in the desired sorted order. The items must, however, be processed through the remaining modules, since N modules are necessary when sorting other batches of up to N items. After 20 clock pulses have occurred, the items are ready to exit module 111-10. For the purposes of illustration, FIG. 3 shows the entry of items output from the sorting modules in register 121 during the next ten cycles, so that at the end of 30 clock pulses, register 121 is filled with the items which have been sorted in the desired order, i.e., items with the lowest values first. Items with value "L" now fill all 20 storage locations within sorting modules 111-1 through 111-10 and these items may be replaced with items having value "s" in preparation for sorting the next batch.

The purpose of providing initial "s" and final "L" header and trailer values in prior art bubble sorting arrangements is to separate items in adjacent batches applied to the serial chain of sorting modules and to prevent items from one batch from infiltrating the items of a preceding or succeeding batch. For example, if the first item with value "L" instead had a value which was not larger than the values of all previous items, it would move forward among some of the preceding items in the sorting modules in the interval between the 10$^{th}$ and 30$^{th}$ clock pulses, producing an error. Similarly, if the initial item with value "s" instead had a value that was not smaller than the values of all succeeding items, the items with the smallest values would overtake some of the items in the previous batch, again resulting in an improper sorter output sequence. Interference between batches can be further illustrated by considering the ten items originally stored in register 101 as being associated with two distinct batches including four and six items, respectively, without any special header ("s" values) or trailer ("L" values) items provided for separation. After these 10 items (8—0—1—9 and 7—5—3—6—4—8) are sorted, the desired result is 0—1—8—9 and 3—4—5—6—7—8. Since the distinction between items in different batches has been lost, the first group of items actually produced is 0—1—3—4 and the second group is 5—6—7—8—8—9.

Provision of special items as headers and trailers for each batch of n items can more than double the time required for sorting from 2n to 4n clock cycles, since initialization with items having "s" values or purging the items with "L" values must each be accomplished serially over an interval of 2n clock cycles. The changeover from items having 2n previous "L" values to the next group of 2n items with "s" values can, however, sometimes be performed simultaneously in one clock cycle; otherwise yet another 2n period is required. Loss in processing speed occasioned by the initialization/purging process described is even more serious, on a relative basis, in conventional hardware implemented bubble sorters. Specifically, the chain of sorting modules is typically made sufficiently long to handle the largest batch of items to be sorted, with N modules being provided for an expected maximum batch size of N items. If short batches are encountered, the entire sorting module chain must nevertheless be initialized and purged using 2N special s and L header/trailer items. In this event, initialization/purging uses more time than is required for actual sorting.

Figure 4:
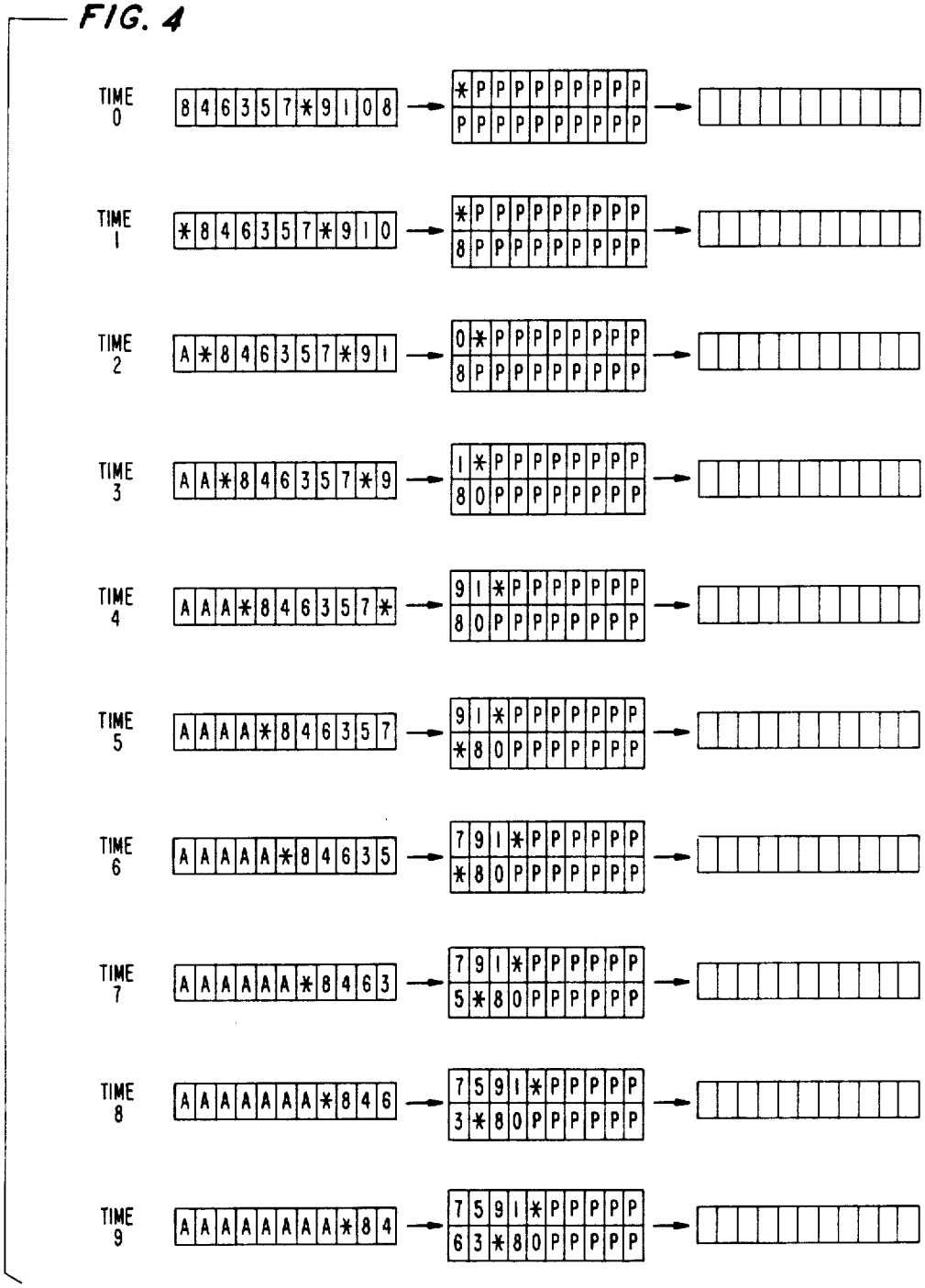
FIGS. 4-6 illustrate how two batches of items are processed using bubble sorting in accordance with the present invention.
Figure 5:
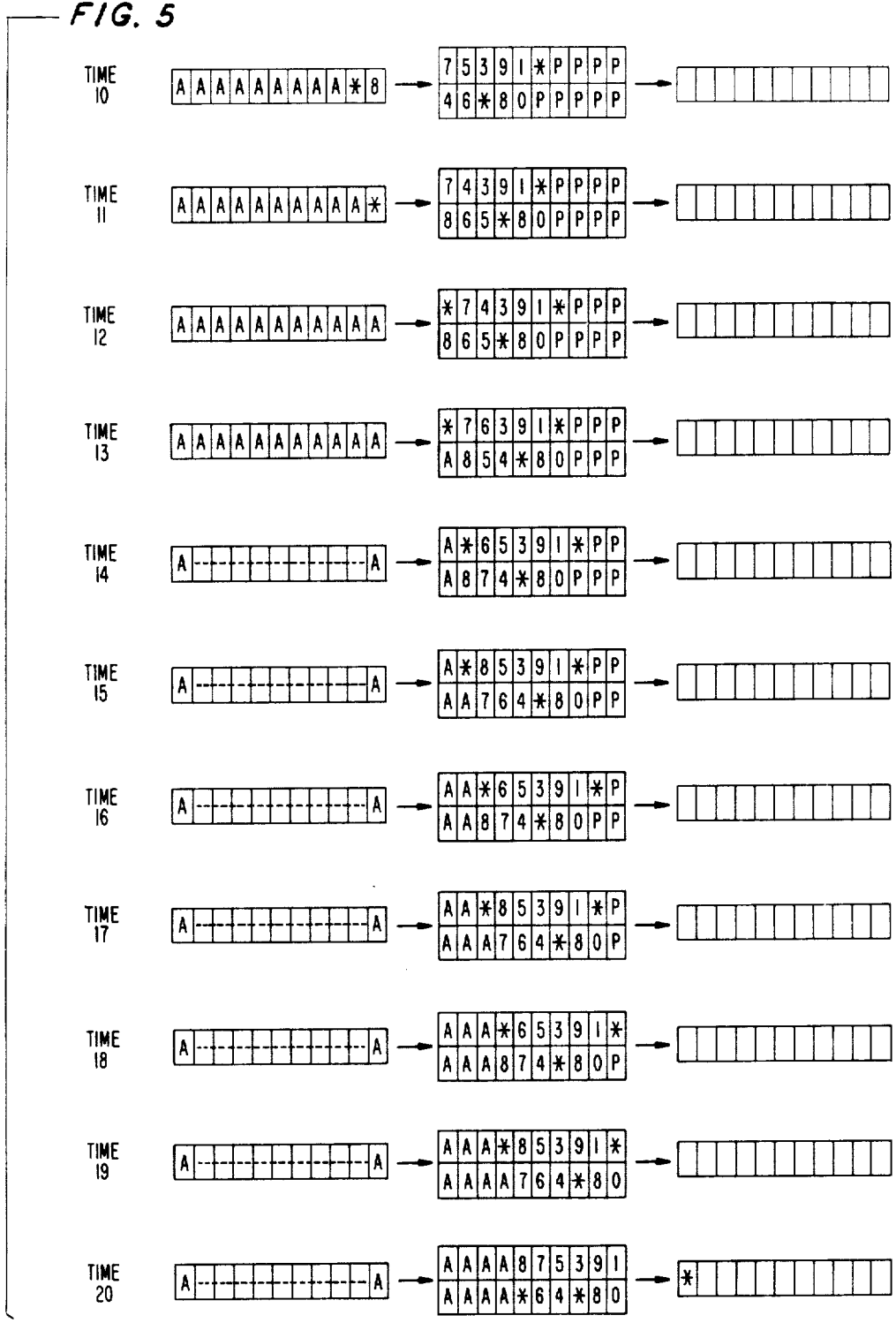
Figure 6:
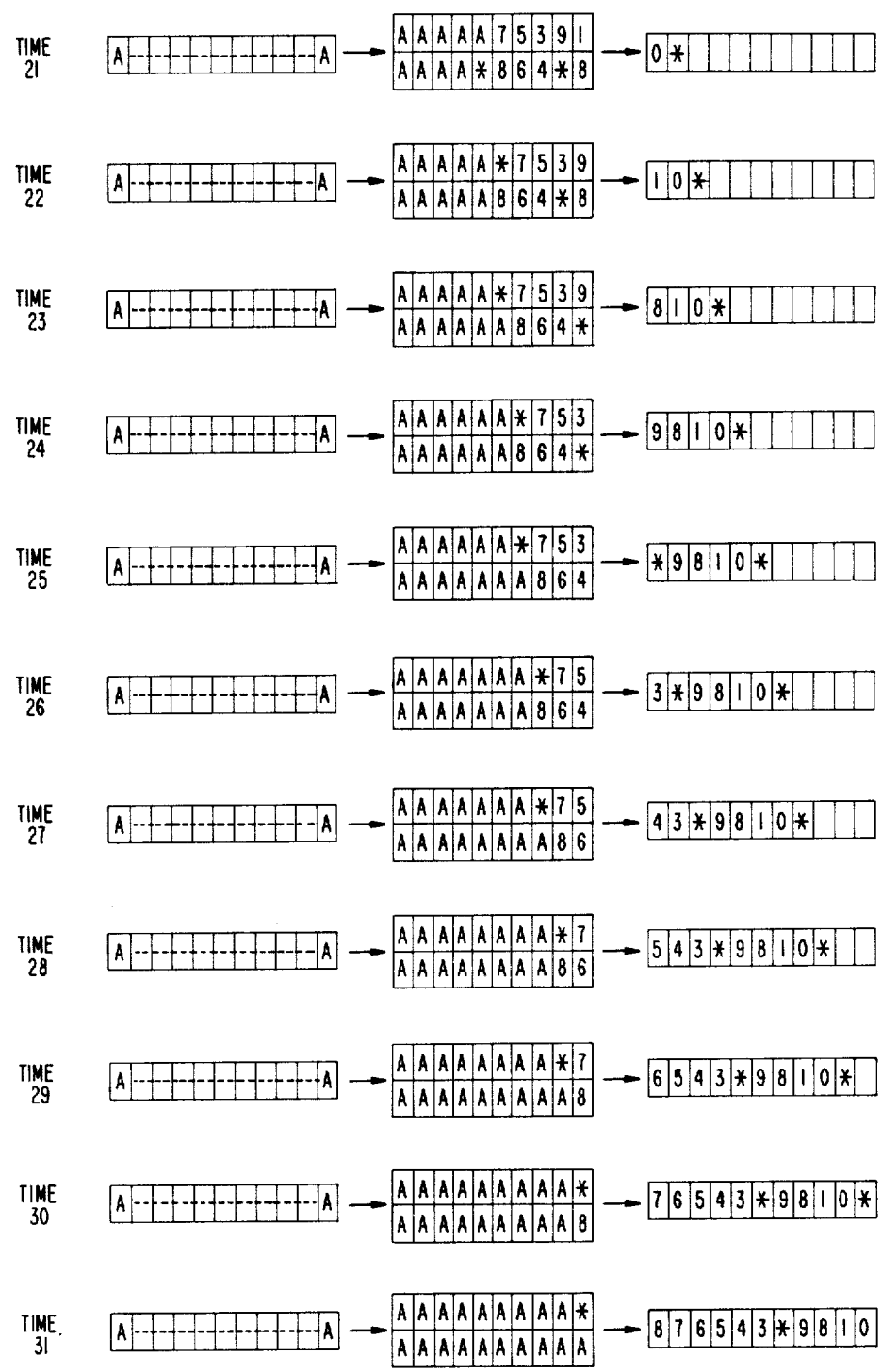

The difficulties encountered by virtue of the initialization/purging process just described are avoided in accordance with the present invention by inserting a spacer item having a unique value between each batch of items to be sorted, and by making each sorting module sensitive to the presence of the spacer, which is shown graphically in FIGS. 4–6 as an asterisk "*". When a spacer is detected by a module, that module is arranged to output stored items in the same order as they were applied, over the next two clock pulses. This arrangement insures that the items from each batch will not infiltrate the items from preceding or succeeding batches. To illustrate, the same 10 items with the same values used in the example of FIGS. 1–3 are assumed to constitute a first batch with four items (8—0—1—9) and a second batch of six items (7—5—3—6—4—8). However, the batches are separated by an extra spacer item or unique key having a unique value symbolized by "*" in FIG. 4. In this example, it is assumed that sorting modules 111-1 through 111-10 initially contain items with values "P" from one or more previous batches, and that the most recent input to module 111-1 is a spacer item which separates the previous batch of items from the about to be processed batch which has values 8—0—1—9 and which are stored in register locations 101-1 to 101-4.

After the occurrence of the first clock pulse (t=1), the previous item stored in one of the storage locations (lower half) of sorting module 111-1 has shifted to the next module 111-2 and the initial item with value (8) stored in storage location 101-1 has replaced it. This occurs because the spacer item represented by the asterisk "*" symbol was the last item to enter module 111-1. When the spacer item was detected, module 111-1 was made to retain that item and pass the other stored item to the next module. For the same reason, after the second clock pulse (t=2), the spacer item moved to module 111-2, since it then is not the most recent entry in module 111-1. After four clock pulses, as shown in FIG. 4, all of the items in the first batch are contained in sorting modules 111-1 and 111-2. When the next clock pulse occurs, the spacer item that follows the first batch and separates it from the succeeding batch enters module 111-1.

The operation of the sorting modules in the presence of a spacer item is further illustrated by comparing the status of the modules before and after the 6$^{th}$ clock pulse. It is seen that the spacer item in sorting module 111-3 has moved to the next module in this interval, because that item had already been in place for two clock cycles. On the other hand, the spacer item in module 111-1 has not moved, since that item had only been entered at the previous cycle and, therefore, was the most recently entered item. To summarize, the sorting modules of the present invention operate by comparing the values of two stored items at each clock cycle and by applying one item to the next module, depending upon the relationship between the values of the items. Normally, the values of the items are compared, either numerically, alphabetically, or in accordance with another desired relationship. However, when a spacer item having a unique value is detected, it is treated specially, and the module operates differently. The selection of an item to transfer to the next module is now based upon the order in which the items were applied to that module. The oldest item is applied to the next modules independent of its value, while the most recently applied item is held in each module for one clock interval.

Continuing with a description of FIG. 5, after the 12$^{th}$ clock pulse has occurred, the six items in the second batch and the spacer item which separates this batch from yet another batch has been fully entered in the sorting module chain. Still more items may be entered after this batch, but for this purpose of the example those items have items simply designated by the symbol "A".

Operation of the sorting apparatus continues for several more cycles, until after the 20$^{th}$ cycle (see FIG. 5), the initial item in the first batch is ready to be output from module 110-10. Output items may be entered in a storage register or applied to another utilization device. For the purposes of illustration, however, the items are shown in FIG. 6 as they are entered and shifted through register 121. As will be seen, after 30 clock pulses, both batches of items have been properly sorted, without wasted time needed to initialize or purge the sorting modules with special items having the small (s) or large (L) keys needed in prior art arrangements typified by the examples shown in FIGS. 1-3.

Figure 7:
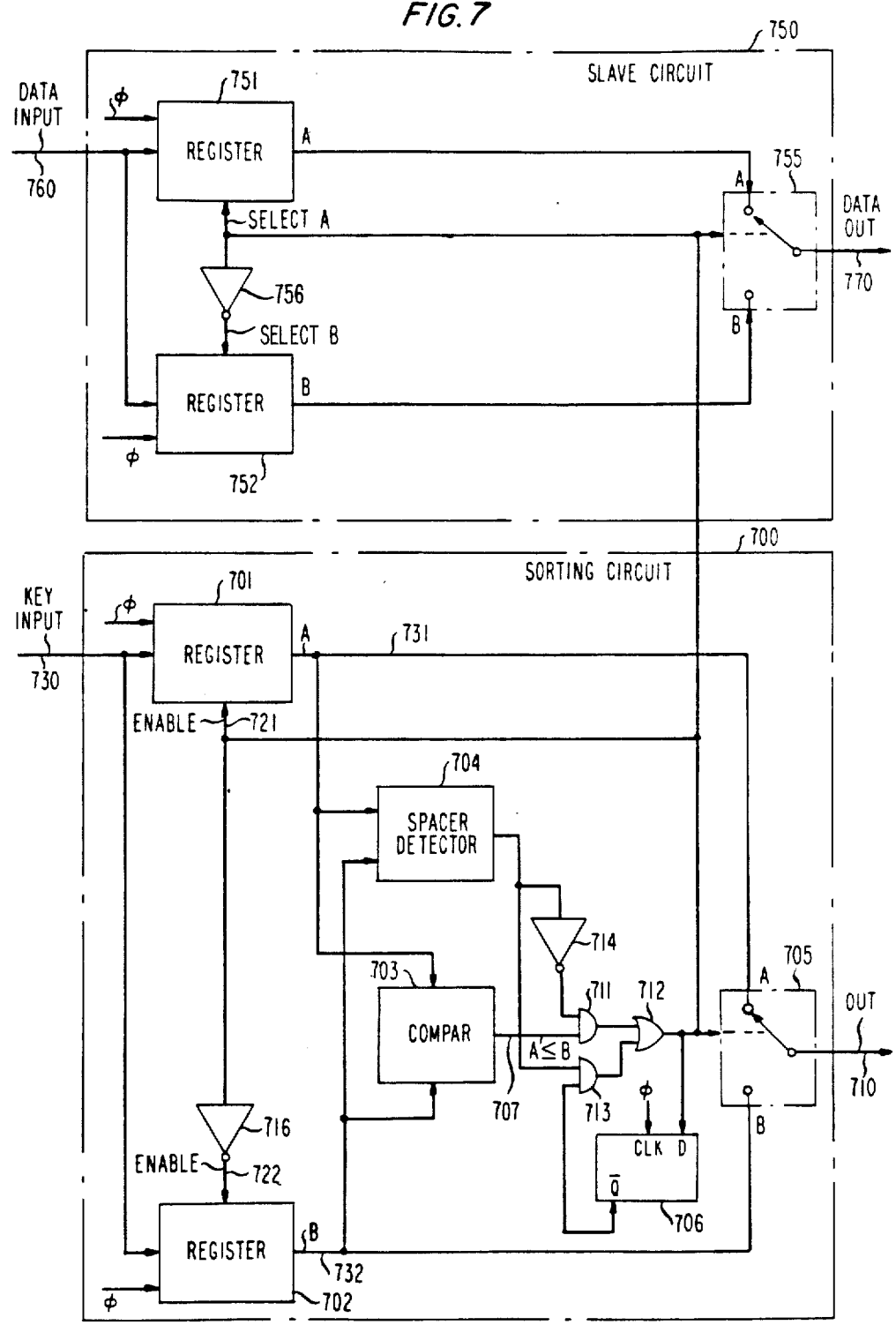
FIGS. 7 and 8 show block diagrams of different embodiments of modules arranged to sort records which are constructed in accordance with the present invention.

A block diagram of one embodiment of a record sorting module arranged in accordance with the principles of the present invention is shown in FIG. 7. Basically, each record sorting module includes a sorting circuit 700 for sorting keys associated with each record in the manner just described, and a slave circuit 750 for rearranging the data of each record in the same sequence as the corresponding key. Sorting circuit 700 receives the keys associated with each record, and performs a sort in the manner described above, by comparing the keys and selecting one key for output based on the relative value or order of entry of the keys. The slave circuit 750 receives the data for the record having the corresponding key, and selects the data of one record for output when the corresponding key was selected in the sorting circuit.

To perform key sorting, a key associated with a record is input on line 740, and entered in one or the other of two key registers 701 or 702 at the next occurrence of a clock pulse $\phi$ generated from a clock source not shown. The particular one of the registers that receives the key is dependent upon which of the keys stored in those registers was selected for application to the sorting circuit of the next module in the chain. This selection is ordinarily made by comparing the values of the keys stored in registers 701 and 702, which are denominated "A" and "B", respectively, for ease of further description. However, in the case where one of the stored keys has a unique value recognized as a spacer item, the values are ignored and the keys are output in the same temporal order in which they were entered in registers 701 and 702. Selection based upon key value is accomplished in a comparator 703 which receives inputs (i.e., A and B) from both registers 701, 702 and provides a high output on line 707 if $A \leq B$ when it is desired, for example, to sort the items in lowest to highest numerical order. If the opposite numerical order is desired, comparator 703 is easily modified to provide a high output when $A \geq B$.

When the key (A) stored in register 701 is smaller than the key (B) in register 702, the high output of comparator 703 is passed through AND gate 711 and OR gate 712 and applied to the enable input 721 of register 701, causing the presently stored key (A) to be output on line 731 while the new key (on input line 740) is entered in the register. Inversion of the high output of OR gate 712 using inverter 716 assures that the enable input 722 of register 702 is not activated when $A \leq B$. The key A is coupled to the output 710 of sorting circuit 700 via a multiplexer switch 705, which also receives a position control input from OR gate 712. As shown in FIG. 7, switch 705 couples the value A to output 710 when the output of OR gate 712 is high. Alternatively, when the key in register 701 is greater than the key in register 702 (A>B), the outputs of AND gate 711 and OR gate 712 are low, causing inverter 716 to enable register 702 (via line 722) to apply its stored key to switch 705 and to accept the next key from line 740. Key B is coupled through repositioned switch 705 to output 710.

The sorting circuit of FIG. 7 also includes a spacer item detector 704 which receives inputs from both registers 701 and 702 and monitors the presence of a unique spacer item value in either storage location. Upon detection, the output of detector goes high, disabling AND gate 711 by virtue of inverter 714 and enabling AND gate 713 to pass a signal derived from the inverted ($\bar{Q}$) output of a flip-flop 706 to OR gate 712.

Flip-flop 706 serves as a one bit memory by receiving the output of OR gate 712 at its data (D) input, and storing that value until the next clock pulse $\phi$ is applied at a clock input. If, for example, the spacer item was the most recent entry to register 701, the high output of OR gate 712 which permitted that entry causes the $\bar{Q}$ output of flip-flop 706 to be low, and this in turn assures that the outputs of AND gate 713 and OR gate 712 are low when the next clock pulse occurs. As a result, the next item applied to multiplexer 705 would then come from register 702, independent of a value comparison. Since the spacer item remains in register 701, the output of detector 704 stays high, keeping AND gate 713 enabled at the start of the next cycle. Now, however, the low output of OR gate 712 causes the $\bar{Q}$ output of flip-flop to be high at the next clock pulse $\phi$. The resulting high outputs from AND gate 713 and OR gate 712 cause the spacer key to be output from register 701, completing the desired two cycle operation. To summarize, in normal operation, sorting circuit 700 selects a key for application to the next module as function of the relative values of the keys. However, after detection of a spacer item, the keys in the sorting module are read out in the same order in which they were applied.

Each of the record sorting modules 111-1 through 111-10 of FIGS. 4-6 also include slave circuits such as circuit 750 of FIG. 7 which arrange the data of each record in the same order as the corresponding key associated with that record. For this purpose, circuit 750 includes data registers 751 and 752 each capable of storing the data of a record received on data input 760. The output of OR gate 712 which directly enables register 701 and which enables register 702 via inverter 716, also supplies enable inputs directly to register 751 and via inverter 756 to register 752. By slaving these registers to the registers in sorting circuit 700, data may be entered in the appropriate register at the occurrence of a clock pulse $\phi$. Slave circuit 750 also includes a multiplexer switch 755 identical to multiplexer 705 which is also responsive to the output of OR gate 712, so that data output from the selected register 751 or 752 is coupled to data output 770.

Various modifications to the sorting module arrangement of the present invention can be made by those skilled in the art, depending upon the nature of the items being sorted. Normally, the items are signed multibit words applied in parallel to registers 701 and 702, and comparator 703 is arranged to numerically compare the values giving recognition to sign bits. However, it may be desirable to sort on absolute magnitude alone in some instances. The items can also be words that are sorted alphabetically, or alphanumeric symbols sorted in accordance with any other predetermined relationship. The spacer item may be a unique (usually multibit) word reserved for the purpose, and 704 detector may be a logic circuit arranged to compare each input with a prestored version of the spacer item. When records are sorted, registers 751 and 752 may be larger than registers 701 and 702, depending upon the amount of data they contain.

Figure 8:
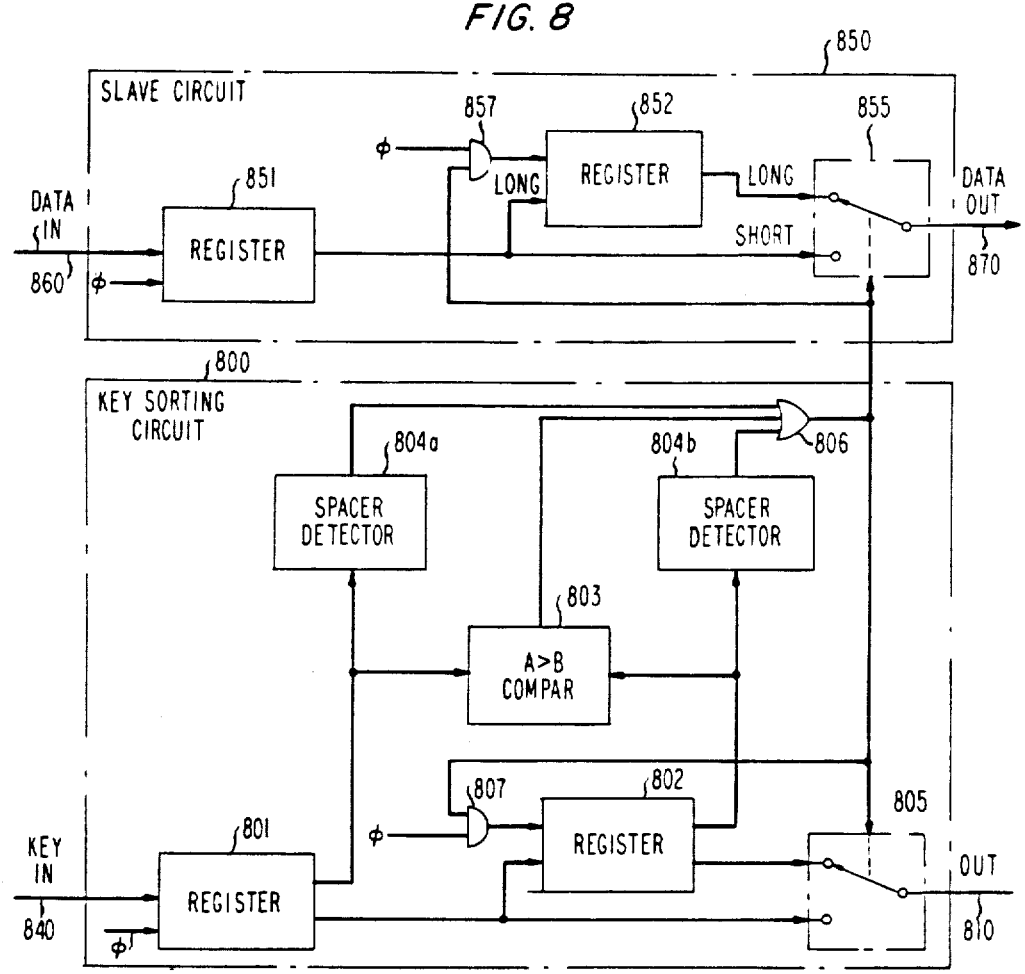

Another embodiment of a record sorting module arranged in accordance with the principles of the present invention is shown in FIG. 8. Like the just described arrangement, a sorting circuit 800 and a slave circuit 850 are provided for respectively sorting the keys and corresponding data in batches of records. Sorting circuit 800 includes first and second key storage registers 801 and 802, but each key applied on input line 840 is always entered in the first register 801 at each clock pulse φ. The keys stored in registers 801 and 802 are compared in a comparator 803, which produces a high output if the value (called A) in register 801 exceeds the value (called B) in register 802, assuming that lowest to highest numerical sorting is desired. For highest to lowest sorting, the output of comparator 803 goes high when $A \leq B$.

If the output of comparator 803 is high, the resulting high output of OR gate 806 positions a multiplexer 805 to couple the key stored in register 802 to output line 810. AND gate 807 is enabled to pass a clock pulse φ to register 802, so that its stored key will in fact be output and replaced by the key stored in register 801. On the other hand, if the output of comparator 803 is low, the output of OR gate 806 is also low, provided a spacer item is not detected. In this event, switch 805 is repositioned to couple the key (A) stored in register 801 directly to multiplexer 805. AND gate 807 is disabled at this time, so that the key in register 802 is not disturbed. To summarize, sorting circuit 800 compares the value of each key stored in register 801 to the value of the previous key input stored in register 802. If a particular predefined relationship is satisfied (eg, the recent input is smaller than the previous input), the newly received key is applied to output 810 of the sorting circuit. If the relationship is not satisfied (eg, recent input is larger), the previously received key in register 802 is connected to output 810, and replaced by the recent input. To detect a unique key for a spacer item, the circuit of FIG. 8 includes spacer detectors 804a and 804b which monitor the contents of registers 801 and 802, respectively. If a spacer item is detected, the high output from detector 804a and 804b is coupled through OR gate 806 to ensure that multiplexer 805 remains in the position shown in FIG. 8. In this condition, the key stored in register 802 for the longer time is output, and the key associated with the spacer item is transferred to register 802 and output at the next occurrence of clock pulse φ. The order of the key is thus preserved, as desired, when a spacer key is detected.

Like the arrangement of FIG. 7, the arrangement of FIG. 8 includes a slave circuit 850 which sorts data or records for each item in accordance with the key associated with that item. Circuit 850 includes first and second data registers 851 and 852, with register 851 receiving an input word from line 860 and applying its contents to output line 870 via multiplexer 855 when $A \leq B$ and switch 855 is repositioned. When $A > B$, or when a spacer key is detected, the output of OR gate 806 is high, multiplexer 855 is positioned as shown in FIG. 8, and the information held in register 852 is output and replaced by the data in register 851 when clocked via AND gate 857.

Figure 9:
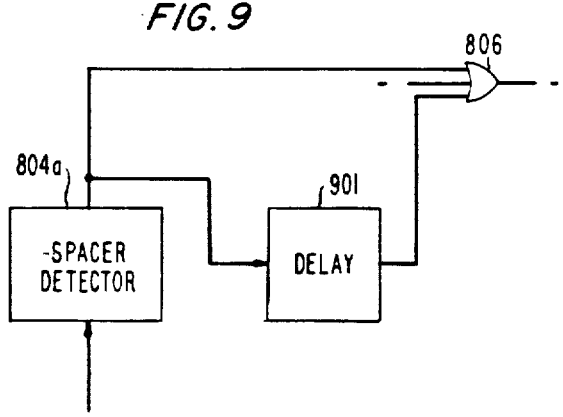
FIG. 9 illustrates an alternative arrangement for performing the spacer detection function in the sorting module of FIG. 8.

A portion of the sorting module circuit shown in FIG. 8 can be varied as shown in FIG. 9 by replacing spacer detector 804b with a delay circuit 901 arranged to receive the output of detector 804a and produce a high output at the next clock pulse φ. This simplification recognizes that when a spacer key is detected in register 801 (by detector 804a), it will always be detected in register 802 (by detector 804b) one clock cycle later.

Figure 10:
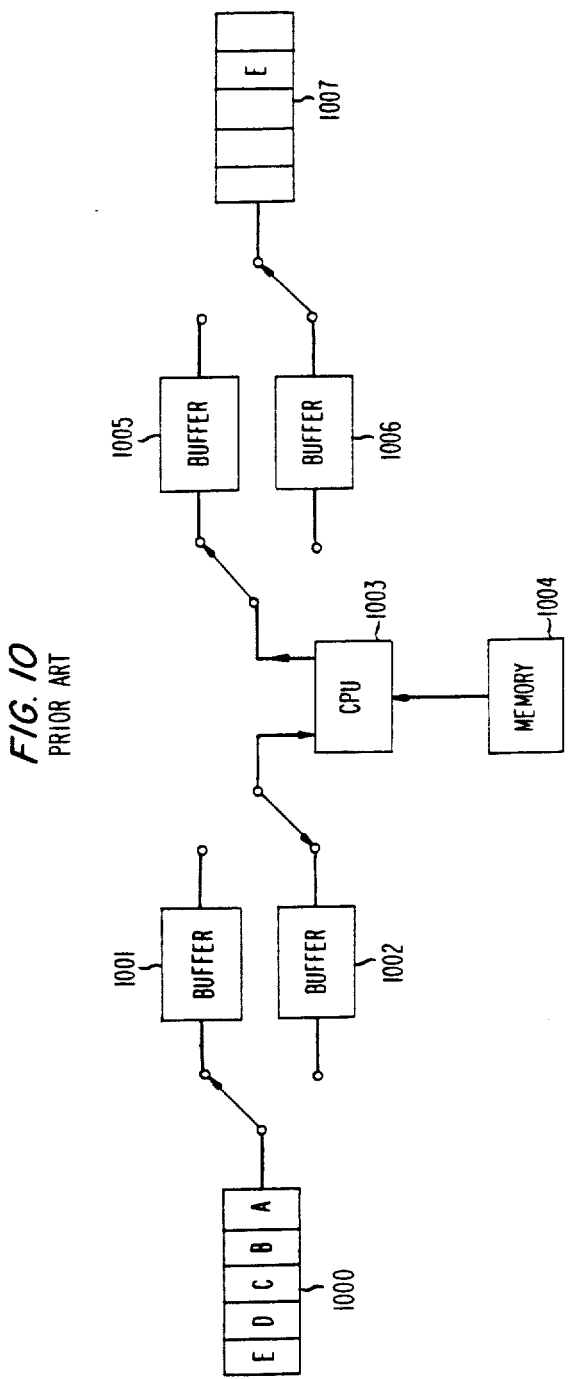
FIG. 10 is a block diagram of a prior art time slot interchanger.

The sorting apparatus and technique just described has many uses, such as in a time slot interchanger which can rearrange the sequence of a series of time-division multiplexed data signals. A traditional time slot interchanger (exchanger) is shown in FIG. 10. Data in a series of time slots 1000 is sequentially loaded in a double buffered memory including buffers 1001 and 1002. When one of the buffers is being loaded, data from the other is being processed. Similarly, buffers 1005 and 1006 are organized as a double buffer such that when buffer 1006 is being read, buffer 1005 is being written, and vice versa. A memory 1004 is arranged to instruct a processing unit 1003 of the desired interchanges; for example, data originally in time slot E may be destined for time slot B and so on. Processing unit 1003 would then fetch the data in time slot E from buffer 1001 or 1002 and place it in buffer 1005 or 1006 in the location corresponding to slot B. After data from all of the time slots stored in buffer 1001 or 1002 has been transferred to buffer 1005 or 1006, the desired time slot sequence 1007 is obtained. However, this prior art interchange technique requires a considerable amount of hardware and a relatively long processing time; each time slot exchange requires one read from memory, one read from a buffer and one write to a buffer. Thus, N time slots require 3N cycles to process. As a result, the input and output buffers can only be exchanged every 3N cycles. The overall latency for such a time slot exchanger would be 9N cycles. A new time slot can be fed to the time slot exchanger every 3 cycles.

A time slot interchanger which greatly improves processing time using the sorting technique of the present invention is shown in block diagram form in FIG. 11. The interchanger can be implemented using the record sorting modules as shown in FIG. 7 or 8. In this arrangement, the data to be sorted is the contents of the time slots within each frame of a time-division multiplexed signal. Associated keys are added to the data by a key assigner 1104 to designate the desired time slot positions. As an example, data in a frame with five time slots A–E illustrated in FIG. 11 is input on line 1101 and entered in a register 1102 in the order (D—B—E—C—A) received. To permute the order of the time slots to a desired order such as (C—A—D—E—B), key assigner 1104 associates a key with each time slot. In the example of FIG. 11, since it is desired to move data in slot C from fourth to first position, the former is assigned a key of value "1". Similarly, the data in slot B is to be moved from second to fifth position, so it is assigned a key of value "5". A unique "spacer38 key 1103 is prepended to the frame consisting of five records by a spacer generator 1105.

Time slot interchange is effected by applying the records (keys and data) to a serial chain of N record sorting modules 1120-1, 1120-2, . . . 1120-N, which, as mentioned previously, can be arranged like apparatus of FIG. 7 or 8 to include a sorter circuit and a slave circuit. The keys are sorted as they are transferred from the sorting circuit in one module to the sorting circuit in the next module, while the data is rearranged in the corresponding sequence by the slave circuits. The value of N is chosen to equal the longest expected batch of records (in this case, five slots). The output from the last sorting circuit in the chain of modules is the original data sorted in the desired order. This data can be entered in a register 1110 or applied to further processing circuitry, if desired, while the keys are discarded.

Time slot exchanging using sorting as just described has a latency of 3N, and a new time slot can be processed at each cycle. This results in a factor of 3 reduction in latency and a factor of 3 increase in throughput rate over the traditional time slot interchanger as shown in FIG. 10.

A chain of record sorting modules of the type shown in FIG. 7 or 8 can also be used to rearrange time slots in each frame of a time-division multiplexed signal for the purpose of making use of the empty slots.

Frames 1201 and 1211, respectively, contain time slots of a first and a second time-division multiplexed signal. Keys 1 through M are assigned to the M slots in each frame such that the frames can be merged after rearrangement. Specifically, the keys for filled time slots in one signal are uniquely selected from among the keys assigned to empty time slots in the other signal. The keys associated with the remaining time slots in each frame are assigned as desired from among the remaining unused ones of the original M keys. The keys assigned to each frame are then separately sorted, and the associated time slot data is correspondingly rearranged. New frames thus produced can be merged to yield a final sequence with fewer empty time slots. This technique can be applied as long as the total number of filled slots in both frames is less than the number of slots in each frame. In the example shown in FIG. 12, the empty slots 1, 3 and 4 in frame 1201 are assigned keys 1, 3 and 5, while the filled slots 1, 2 and 3 of frame 1211 are assigned keys uniquely selected from the same set (1, 3 and 5) assigned to the empty slots in frame 1201. The remaining keys are assigned to remaining slots in frames 1201 and 1211 in the exemplary sequences 1202, 1212.

The records thus formed (keys plus time slot data) are separately arranged by record sorting modules 1203 and 1213 which produce new frames 1204 and 1214, respectively. These frames can be merged via multiplexer 1220 or another similar combining device to yield a combined output frame 1230 which advantageously is devoid of excessive empty time slots.

The sorting module arrangement of the present invention is easily implemented using VLSI technology, and the modularity of the design permits numerous efficiencies.

Various adaptations and modifications of the present invention may be made by those skilled in the art without departing from the spirit and scope of the present invention. Accordingly, the invention is to be limited only by the appended claims. For example, while the sorting modules were shown as receiving clock pulses from a single clock source, it is possible to daisy chain the modules with respect to timing so that each module receives a timing pulse from the preceding module. Furthermore, it should be recognized that sorting and permuting are quite similar and that a sorting chain can be used to perform permutations simply by relabeling the values of the keys.

What is claimed is:

1. Apparatus for rearranging items in a desired sequence, comprising:
   a plurality of serially connected sorting modules;
   means in each module in said series for receiving two sequentially applied items; and
   means in each module normally operative to determine an order for transmitting said items to the next module in said series by comparing the values of said items;
   wherein said modules further include:
   means responsive to detection of a unique spacer item for transmitting said items in the same order in which said items were received by said module.

2. Apparatus for sorting records in a desired sequence in accordance with a key associated with each record, comprising:
   a plurality of serially connected sorting modules arranged to sequentially receive said records; and
   means in each of said modules for determining an output sequence in which records received by said module are applied to the next module in said series;
   wherein said output sequence determining means is characterized by
   means for detecting a unique key associated with a record; and
   means responsive to detection of said unique key for determining said output sequence in accordance with the sequence in which said records were applied to said module.

3. Apparatus for sorting a plurality of records each including a key and an item of data in each of a series of batches in a desired order determined by the relationship of keys associated with each of said records, including:
   a serial chain of sorting modules adapted to receive said keys and sort said keys as they are transmitted from one module to the next in said chain; and
   means responsive to said sorting modules for rearranging said data in the same order as the corresponding key;
   wherein said sorting modules each include:
   means for detecting the presence within a module of a unique key associated with a record which separates said batches; and
   means for selecting the order in which said keys are sorted during application from one module to the next in response to an output from said detecting means.

4. Apparatus for sorting a plurality of items including:
   a plurality of serially connected sorting modules adapted to rearrange said items in a desired order, said modules including:
   means for controlling the sequence in which items received by a module are applied to the next module in said series; and
   means for detecting the presence of a spacer item within a module;
   where said controlling means are responsive to an output from said detecting means.

5. Apparatus for sorting records in a desired sequence in accordance with a key associated with each record, comprising:
   a plurality of serially connected sorting modules arranged to sequentially receive and sort said records dependent on the values of said associated keys;
   means for detecting a unique key; and
   means responsive to detection of said unique key in each of said modules for determining an output sequence in which records received by said module are applied to the next module in said series independent of said values of said associated keys.

6. Apparatus for rearranging the sequence of a series of data items including:
   means for assigning a key to each data item, the value of said key indicating the desired position of said data item in an output sequence; and
   means for applying said keys and corresponding data items to a chain of sorting modules each including a sorting circuit for sorting said keys and a slave circuit for rearranging said data item in the same sequence as the corresponding key.

7. The invention defined in claim 6 wherein said assigning means includes means for prepending a unique key to each series of keys.

8. The invention defined in claim 7 wherein said sorting circuit includes:
   (a) means for sorting said data items by comparing the relative values of associated keys;
   (b) means for detecting the presence of said unique key within a module; and
   (c) means responsive to said detecting means for sorting said keys in accordance with their order of application to said module.

9. Apparatus for interchanging time slots within each frame of a time-division multiplex signal, including:
   (a) means for assigning a key to each time slot, each key indicating the desired time slot position;
   (b) means for sorting said keys, and
   (c) means for rearranging said time slots in the same sequence as the corresponding keys.

10. The invention defined in claim 9 wherein said sorting means includes:
    a serial chain of sorting modules;
    means in each module in said series for receiving two sequentially applied keys; and
    means in each module normally operative to determine an order for transmitting said keys to the next module in said series by comparing the values of said keys.

11. The invention defined in claim 10 wherein said modules further include:
    means for prepending a unique spacer key to the keys assigned to time slots in each frame; and
    means responsive to detection of said unique spacer key for transmitting said items in the same order in which said items were received by said module.

12. A method of sorting records in a desired sequence in accordance with a key associated with each record, comprising the steps of:
    (a) sequentially applying said records to a plurality of serially connected sorting modules;
    (b) determining an output sequence in which records received by said module are applied to the next module in said series in accordance with the values of said associated keys;
    wherein said output sequence determining step is characterized by
    (c) detecting a unique key associated with a record; and
    (d) responsive to detection of said unique key, determining said output sequence in accordance with the sequence in which said records were applied to said module.

13. A method for sorting a plurality of records each including a key and an item of data in each of a series of batches in a desired order determined by the relationship of keys associated with each of said records, including the steps of:
    sorting said keys as they are transmitted from one module to the next in a serial chain of sorting modules adapted to receive said keys;
    rearranging said data in the same order as the corresponding key;
    wherein said sorting step includes:
    detecting the presence within a module of a unique key associated with a record which separates said batches; and
    selecting the order in which said keys are sorted during application from one module to the next in response to detection of said unique key.

14. A method of sorting a plurality of items including the steps of:
    rearranging said items in a desired order by controlling the sequence in which items are applied from one module to the next module in a chain of serially connected sorting modules;
    detecting the presence of a spacer item within a module; and
    controlling said sequence in response to detection of said spacer item.

15. A method of sorting records in a desired sequence in accordance with a key associated with each record, comprising the step of:
    sorting records sequentially received by a plurality of serially connected sorting modules dependent on the values of said associated keys;
    detecting a unique key; and
    determining an output sequence for each module in response to detection of said unique key, wherein records received by said module are applied to the next module in said series independent of said values of said associated keys.

16. Apparatus for rearranging the sequence of empty and filled time slots in first and second time-division multiplex (TDM) signals so that said rearranged TDM signals can be merged without overlap, including:
    means for assigning keys to the slots in each frame of said first and second signals so that the keys for filled time slots in said second signal are uniquely selected from the set of keys assigned to empty time slots in said first signal;
    means for separately sorting the keys assigned to time slots in each frame of said first and second signals; and
    means for rearranging the times slots in each frame of said first and second signals in accordance with the corresponding keys.

* * * * *